3,042,581
NEW SALTS OF ISONICOTINIC ACID HYDRAZONE COMPOUNDS AND A PROCESS OF MAKING SAME

Henry Penau, Paris, and Guy Hagemann, Vincennes, France, assignors, by mesne assignments, to Roussel-UCLAF, S.A., Paris, France, a corporation of France
No Drawing. Filed Oct. 16, 1957, Ser. No. 690,449
Claims priority, application France July 15, 1954
11 Claims. (Cl. 167—65)

The present invention relates to new and valuable isonicotinic acid hydrazone compounds and more particularly to new salts of the isonicotinic acid hydrazone of benzaldehyde-m-sulfonic acid with an antibiotic having a basic group and to a process of making said salts.

The present application is a continuation-in-part of our copending application Serial No. 515,781, filed June 15, 1955, now abandoned, and entitled "New Salts of Isonicotinic Acid Hydrazone Compounds and a Process of Making Same."

The isonicotinic acid hydrazone of benzaldehyde-m-sulfonic acid corresponds to the following formula

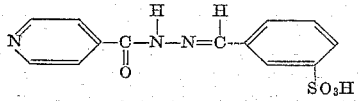

Said hydrazone compound which is known in France as "sulfoniazide" is prepared by condensing isonicotinic acid hydrazide in aqueous medium with benzaldehyde-m-sulfonic acid.

This compound is described in Patent No. 2,727,041.

It is one object of the present invention to provide new and valuable salts of said isonicotinic acid hydrazone of benzaldehyde-m-sulfonic acid. In said salts the sulfo group present in the hydrazone compound is utilized for reaction with the basic groups of antibiotics having such basic groups in their molecule.

Another object of the present invention consists in providing a simple and effective process of producing such new salts of antibiotics having a basic group in their molecule with the isonicotinic acid hydrazone of benzaldehyde-m-sulfonic acid by utilizing the sulfo group of said hydrazone for salt formation with the basic group of such antibiotics.

A further object of the present invention consists in providing a new and valuable salt of the isonicotinic acid hydrazone of benzaldehyde-m-sulfonic acid with streptomycin base or with dihydrostreptomycin base, said new salt being substantially free of the toxic side-effects frequently encountered in therapeutical administration of said streptomycin and dihydrostreptomycin.

Other objects of the present invention and advantageous features thereof will become apparent as the description proceeds.

The new salts can be used with great advantage in place of said antibiotics in human and veterinary medicine and for raising animals. They can be administered in the same manner as said antibiotics. For instance, they can be injected in the form of oily solutions or suspensions or in the form of solutions having a higher viscosity than water such as in propylene glycol, or they can be given orally in the form of tablets, pills, or other suitable pharmaceutical or veterinary preparations. They can be also be applied topically in the form of powders, solutions, suspensions, creams ointments, or the like.

The new salts possess a number of advantages over the antibiotics forming part of their molecule. For instance, they are less toxic than the conventionally used salts of antibiotics of basic nature such as their sulfates, hydrochlorides, etc. Furthermore, a certain advantageous synergistic effect has been observed in the treatment of certain infections and especially in the treatment of tuberculosis. Both components of said new salts exert a cumulative action.

Of particular significance is, for instance, the interesting action of the salt of the isonicotinic acid hydrazone of benzaldehyde-m-sulfonic acid with streptomycin which has a much quicker effect in the treatment of tuberculosis than the classic treatment by means of p-amino salicylic acid, isonicotinic acid hydrazide, streptomycin sulfate, and combinations of said compounds. The new salt surpasses in its effectiveness simultaneous administration of sulfoniazide in the form of its sodium salt and of streptomycin sulfate.

Another important advantage of the new salts of the isonicotinic acid hydrazone of benbaldehyde-m-sulfonic acid with those antibiotics of basic nature that are effective against Koch's bacillus, such as streptomycin, is to be seen in the fact that said new salts yield surprisng results with a dosage considerably lower than the dosage conventionally employed in the administration of said basic antibiotics. Thus, said new salts effectively control tubercular infections by administration of a dose which avoids any risk of the occurrence of side-effects that are often observed when repeatedly administering the required high doses of some of said antibiotics. For instance, streptomycin or dihydrostreptomycin therapy is frequently accompanied by toxic effects, the most serious of which involve the auditory nerve and may produce severe vertigo and/or even loss of hearing. Such auditory, vestibular and cochlear disturbances are completely avoided when administering the new streptomycin and dihydrostreptomycin salts with the isonicotinic acid hydrazone of benzaldehyde-m-sulfonic acid.

Said new salts according to the present invention, furthermore, are characterized by their excellent compatibility with the human system when they are administered by intramuscular injection. This is not always so with other salts of known antibiotics.

Antibiotics having a basic group in their molecule which can be used for salt formation with the isonicotinic acid hydrazone of benzaldehyde-m-sulfonic acid are, for instance, streptomycin, dihydrostreptomycin, framycetin, erythromycin, neomycins.

The new salts are formed either by directly reacting the isonicotinic acid hydrazone of benzaldehyde-m-sulfonic acid in the form of the free acid with the desired antibiotic in the form of the free base or by the process of metathesis whereby a salt of the isonicotinic acid hydrazone of benzaldehyde-m-sulfonic acid is reacted with a salt of the basic antibiotic.

The reaction is preferably effected in the presence of a liquid medium such as water or an organic solvent in which at least one of the reactants is soluble. When proceeding according to the process of metathesis it is advantageous to use the sulfate of the antibiotic and the barium salt of the isonicotinic acid hydrazone of benzaldehyde-m-sulfonic acid and to operate in the presence of water wherein the barium sulfate formed during reaction is practically insoluble while the new salt remains dissolved therein.

The resulting salt can be separated from the reaction mixture by crystallization or by precipitation by means of a suitable solvent such as acetone.

It is understood that all these operations can be carried out under sterile conditions so that it is possible to directly prepare injectable pharmaceutical preparations.

The following examples serve to illustrate the present invention without, however, limiting the same thereto.

EXAMPLE 1

10 g. of streptomycin sulfate are dissolved in 25 cc. of distilled water, thereby forming "solution A." 15.3 g. of the crystalline barium salt of the isonicotinic acid hydrazone of benzaldehyde-m-sulfonic acid are dissolved at a temperature of 90° C. in 37 cc. of distilled water, thereby forming "solution B." Solution A is gradually added, while stirring, to solution B and the resulting mixture is quite rapidly cooled to 35° C. The precipitated barium sulfate is filtered off and the aqueous filtrate containing the new salt is evaporated to dryness in a vacuum. The resulting residue is dissolved in 30 cc. of 80% methanol. 300 cc. of acetone are added to said solution. The precipitate is filtered off and dried in a vacuum. The resulting ω-isonicotinoyl hydrazono benzal-m-sulfonate of streptomycin (streptomycin salt of the isonicotinic acid hydrazone of benzaldehyde-m-sulfonic acid) has the following characteristic properties:

Empirical formula: $C_{21}H_{39}O_{12}N_7 \cdot 3(C_{13}H_{11}N_3O_4S)$.
Molecular weight: 1496.
Rotary power $[\alpha]_D$: $-36°$ (concentration: 2% in water).
Content of isonicotinic acid hydrazone of benzaldehyde-m-sulfonic acid, calculated as free acid: 61.2%.
Activity calculated in γ of streptomycin base: 387γ per mg.

The new salt is very soluble in water, i.e. is capable of forming an about 40% solution therein. It is soluble in 80% methanol, very slightly soluble in ethanol, and insoluble in acetone, benzene, diethyl ether and generally, in most organic solvents.

EXAMPLE 2

10. g. of dihydrostreptomycin sulfate are dissolved in 25 cc. of distilled water, thereby forming "solution A." 15.3 g. of the crystalline barium salt of the isonicotinic acid hydrazone of benzaldehyde-m-sulfonic acid are dissolved in 37 cc. of distilled water at a temperature of about 90° C., thereby forming "solution B." Solution A is added to solution B while vigorously agitating the mixture which is then cooled to 40° C. After decanting from and filtering off the precipitated barium sulfate formed thereby, the aqueous filtrate containing the new salt is concentrated in a vacuum to a volume of 6 cc. Addition of 90 cc. of acetone causes precipitation of the salt which is filtered off and dried in a vacuum. The resulting ω-isonicotinoyl hydrazono benzal-m-sulfonate of dihydrostreptomycin (dihydrostreptomycin salt of the isonicotinic acid hydrazone of benzaldehyde-m-sulfonic acid) has the following characteristic properties:

Empirical formula: $C_{21}H_{41}O_{12}N_7 \cdot 3(C_{13}H_{11}N_3O_4S)$.
Molecular weight: 1498.
Rotatory power $[\alpha]_D$: $-40°$ (concentration: 2% in water).
Content of isonicotinic acid hydrazone of benzaldehyde-m-sulfonic acid, calculated as free acid: 61%.
Activity calculated in γ of dihydrostreptomycin base: 380γ per mg.

Said compound is very soluble in water, i.e. it is capable of forming therewith an about 40% solution. It is soluble in 80% methanol, slightly soluble in pure methanol (to 1%), very slightly soluble in ethanol, and insoluble in acetone, benzene, diethyl ether, chloroform, and most of the conventional organic solvents.

EXAMPLE 3

10 g. of framycetin sulfate, i.e. the antibiotic disclosed and described by the name "Antibiotique E.F. 185" in French Patent No. 1,051,202, filed August 3, 1951, are dissolved in 25 cc. of distilled water, thereby forming "solution A." 18.7 g. of the crystalline barium salt of the isonicotinic acid hydrazone of benzaldehyde-m-sulfonic acid are dissolved in 47 cc. of distilled water at a temperature of 90° C., thereby forming "solution B." Solution B is cooled to 80° C. and added to solution A while stirring vigorously. The mixture is then rapidly cooled to 40° C. The precipitated barium sulfate is separated from the reaction solution by filtration and the aqueous filtrate containing the new salt is concentrated by evaporation in a vacuum. The concentrated solution is then precipitated by adding 1 part thereof to 15 parts of acetone. The precipitated salt is filtered and dried in a vacuum. The resulting ω-isonicotinoyl hydrazono benzal-m-sulfonate of framycetin (framycetin salt of the isonicotinic acid hydrazone of benzaldehyde-m-sulfonic acid) has the following characteristic properties:

Empirical formula: Framycetin.$(C_{13}H_{11}N_3O_4S)_n$ (the formula of framycetin has not yet been fully elucidated).
Rotatory power $[\alpha]_D$: $+26°$ (concentration: 2% in water).
Content of isonicotinic acid hydrazone of benzaldehyde-m-sulfonic acid, calculated as free acid: 70%.
Activity calculated in γ of framycetin base: 300γ per mg.

Said salt is very soluble in water and is capable of forming therewith an about 40% solution. It is soluble in 80% methanol, and insoluble in acetone, diethyl ether, benzene, and conventional organic solvents.

It may be mentioned that framycetin is a basic antibiotic isolated from a strain of Streptomyces sp. Decaris. See, for instance, "Chemical Abstracts," vol. 48, page 8426a (1954).

EXAMPLE 4

25 g. of erythromycin base are dissolved in 100 cc. of methanol. The resulting solution is added to a suspension of 10.5 g. of the isonicotinic acid hydrazone of benzaldehyde-m-sulfonic acid in 100 cc. of methanol. The mixture is stirred vigorously until the reaction is completed, i.e. until the suspended acid is completely dissolved. The methanolic solution is then concentrated by evaporation in a vacuum to one-fourth of its volume. The new salt is isolated in the crystalline state by the addition of 5 times its volume of boiling water and slowly cooling the mixture. After filtration, washing with water, and drying in a vacuum, the resulting ω-isonicotinoyl hydrazono benzal-m-sulfonate of erythromycin (erythromycin salt of the isonicotinic acid hydrazone of benzaldehyde-m-sulfonic acid) exhibits the following characteristic properties:

Empirical formula: $C_{37}H_{67-69}NO_{13} \cdot (C_{13}H_{11}N_3O_4S)$.
Rotatory power $[\alpha]_D$: $-50°$ (concentration: 2% in methanol).
Content of isonicotinic acid hydrazone of benzaldehyde-m-sulfonic acid, calculated as free acid: 31%.
Activity calculated in γ of erythromycin base: 700γ per mg.

Said salt is only slightly soluble in water and is capable of forming therewith an 0.65% solution at 25° C. It is soluble in methanol and ethanol and insoluble in diethyl ether, benzene, chloroform.

In an analogous manner as described in the preceding examples there are produced the salts of the isonicotinic acid hydrazone of benzaldeyde-m-sulfonic acid with neomycins.

In place of the sulfates of said antibiotics as used in the preceding examples, other salts such as the hydrochlorides, phosphates, nitrates can be employed while otherwise proceding in an analogous manner.

In place of the barium salt of the isonicotinic acid hydrazone of benzaldehyde-m-sulfonic acid as used in the preceding examples, there can be employed equimolecular amounts of other salts of said compounds such as the sodium, potassium, calcium, silver salts while otherwise the procedure is analogous to that described in said examples.

The new salt of the isonicotinic acid hydrazone of benzaldehyde-m-sulfonic acid with dihydrostreptomycin prepared, for instance, according to Example 2 is very well tolerated.

No clinical intolerance, such as nausea, anorexia, cutaneous reactions, was observed. Only in 11% of the cases there occurred a certain onset of eosinophilia at the beginning of the treatment. No other anomalous symptoms were found.

The clinical results were very favorable. Intramuscular injection of 1.428 g. of said new salt per day, subdivided in 2 doses, was painless. It was continued for a period of time between one month and four months. Of 45 tubercular patients treated, 74.5% of those patients in whom the disease was discovered within less than six months before the treatment was started, responded very favorably to the treatment. The initial lesions were rapidly cleaned, especially in malign cases (extended ulcero-nodular forms) and in pulmonary cases (segmentites and polysegmetites). In all these cases elimination or regression of cavities was noted at the end of the first month of the treatment. Even a number of more chronic cases were considerably improved.

The new salts of the isonicotinic acid hydrazone of benzaldehyde-m-sulfonic acid with dihydrostreptomycin and other antibiotics with basic groups exhibit an unexpected synergistic effect over the components in that they are superior in their activity to similar known combinations such as streptoniazide but also that they are considerably less toxic than the antibiotics themselves and their known combinations such as streptoniazide. This will become evident from the following comparative tests.

Albumen containing Dubos culture media are prepared and inoculated as uniformly as possible with various strains of tubercle bacilli. These initial cultures are cultivated until their turbidity is such that the amount added to a series of test tubes containing various concentrations of the tuberculostatic agent to be tested responds to about 0.01 mg. of bacilli per test tube containing 5 cc. of the culture medium.

The following antibiotics and preparations were tested:

(1) Dihydrostreptomycin.
(2) Isonicotinic acid hydrazide.
(3) Isonicotinic acid hydrazone of benzaldehyde-m-sulfonic acid.
(4) The reaction product of isonicotinic acid hydrazide with streptomycin, i.e. streptomycilidene isonicotinoyl hydrazine in the form of its sulfate.
(5) The salt according to the present invention consisting of benzaldehyde-m-sulfonic acid isonicotinic hydrazone and dihydrostreptomycin.

The antibiotics are added to the test tube in varying amounts in the form of sterile solutions whereby the volume of the solutions is as small as possible.

The minimum concentrations which inhibit growth of the tubercle bacilli are determined and the mean value of two determinations are given in the following table.

In principle the inoculum in each tube corresponds to that of the strain H37RV which under the same conditions is inhibited by $0.1\gamma$ to $0.05\gamma$ of streptomycin when kept at 37° for 10 days. The pH-value of the Dubos culture medium is about 7.0. The following table shows the results achieved in this test:

Table

| Strain of Tubercle Bacillus | Minimum Inhibitory Concentration in gamma/cc. | | | | |
|---|---|---|---|---|---|
| | Dihydrostreptomycin | Isonicotinic acid hydrazide | Isonicotinic acid hydrazone of benzaldehyde-m-sulfonic acid | Streptoniazide | Salt of Isonicotinic acid hydrazone of benzaldehyde-m-sulfonic acid with dihydrostreptomycin |
| 12701 | 0.6 | 0.02 | 0.02 | 0.4 | 0.06 |
| 11493 | 0.1 | 0.02 | 0.02 | 0.2 | 0.02 |
| 1106 | | | | 0.2 | 0.06 |
| 12084 | 0.6 | >5 | >5 | 0.6 | 2 |

The new salt according to the present invention contains 39% of dihydrostreptomycin and 61% of the isonicotinic acid hydrazone of benzaldehyde-m-sulfonic acid, while streptoniazide contains 70% of streptomycin and 16% of isoniazide. The table clearly shows the superiority of the new salt over the combination of streptomycin and isonicotinic acid hydrazide (Streptoniazide). It furthermore shows, especially the test with the strain 11493, that the new salt has the same minimum inhibitory concentration as isonicotinic acid hydrazide, thus, proving that an unexpected and unobvious synergistic effect is achieved. These tests also show that the new effect is not merely a summation of the effects of the components of the new salt. For instance, the new salt according to the present invention has the same activity as isonicotinic acid hydrazide against the strain 11493, while an activity between $0.02\gamma/cc.$ (activity of the isonicotinic acid hydrazone of benzaldehyde-m-sulfonic acid) and $0.1\gamma/cc.$ (activity of dihydrostreptomycin) could be expected. Against the strain 12701 it was to be expected that the activity of the new salt would be about 0.25 when calculating the activity from that of its two components. Actually, the minimum inhibitory concentration is only $0.06\gamma/cc.$ indicating that the new salt is at least 4 times as effective as calculated. Against strain 11493 the calculated value would be about $0.05\gamma/cc.$ while actually the minimum inhibitory concentration is $0.02\gamma/cc.$, i.e. about 2½ times the calculated amount. Against the strain 12084 the minimum inhibitory concentration of the two components of the new salt would be calculated to $3.25\gamma$. Actually it has been found to be $2.0\gamma/cc.$, i.e. at least 60% higher than the calculated activity.

In contrast thereto, the combination of streptomycin and isonicotinic acid hydrazide does not show such a synergistic effect. Actually, as seen in the test with the strain 11493, the combination is less effective than dihydrostreptomycin itself and in the test with strain 12084 it is only as effective as dihydrostreptomycin, while in the test with strain 12701 it is only slightly superior to that of dihydrostreptomycin.

The toxicity of the salt of the isonicotinic acid hydrazone of benzaldehyde-m-sulfonic acid with dihydrostreptomycin according to the present invention was determined and compared with the toxicity of the reaction product of isonicotinic acid hydrazide with streptomycin as disclosed by Bernstein et al., "Amer. Review Tuberculosis," vol. 67, page 363 (1953), and with dihydrostreptomycin itself. The dose required to kill 50% of the test mice to which said test compounds were administered subcutaneously was determined. Said dose is designated as $LD_{50}$. The following data show the superiority and the low toxicity of the isonicotinic acid hydrazone of benzaldehyde-m-sulfonic acid with dihydrostreptomycin in comparison with the reaction product of isonicotinic acid hydrazide with streptomycin and with dihydrostreptomycin as such.

LD$_{50}$ in mg./kg.

| | |
|---|---|
| Reaction product of isonicotinic acid hydrazide with streptomycin | 1107.5 |
| Streptomycin | 1114.5 |
| Dihydrostreptomycin | 1536.0 |
| Salt of the isonicotinic acid hydrazone of benzaldehyde-m-sulfonic acid with dihydrostreptomycin | 8332.5 |

This table clearly shows that the compound according to the present application, namely the salt of the isonicotinic acid hydrazone of benzaldehyde-m-sulfonic acid with dihydrostreptomycin is about 7.5 times less toxic than streptomycin and the reaction product of isonicotinic acid hydrazide with streptomycin.

It is also about 5 times less toxic than dihydrostreptomycin itself. Even when taking into consideration that the new salt contains only about 50% of dihydrostreptomycin, it is almost 3 times less toxic—calculated for its dihydrostreptomycin content—than said antibiotic. It is evident from these tests that considerable detoxification of dihydrostreptomycin has been achieved and that, therefore, the experimental animals tolerate about three times the dose of dihydrostreptomycin.

As stated hereinabove, the new salts of the nicotinic acid hydrazone of benzaldehyde-m-sulfonic acid with basic antibiotics and especially with dihydrostreptomycin has proved to be of great value for combating tuberculosis in humans, poultry, cattle, monkeys, and other animals.

Said salts are administered orally, parenterally, or also topically. Oral preparations are preferably in the form of tablets, dragees, pills, or other shaped forms. It is, of course, also possible to orally administer the new salts in the form of powders, preferably enclosed by capsules.

The readily water soluble salts may also be orally administered in the form of sirups and the like aqueous solutions.

Parenteral administration, for instance, by intramuscular injection has proved to be especially suitable. Solutions of the salts in water or isotonic salt solution are employed for such intramuscular injection. The injections are painless. The solutions may directly be obtained on preparing the salts as it has been described hereinabove in the examples.

For veterinary use the new salts may be intimately mixed with animal feed and may be administered in such animal feed form.

Preferably the new salts are not used in their original form but diluted by suitable diluting agents, thus allowing better and more economical use to be made thereof. In the case of powders, a fine even dispersion of the active product is of importance. Such a fine dispersion can be achieved, for instance, by intimately mixing and milling the salt, for instance, in a ball mill with a solid pulverulent extending agent, such as lactose or the like, to the desired degree of fineness or by impregnating the already milled, finely powdered, solid carrier with a mixture of the active compound in water or another suitable solvent and then removing water or solvent by evaporation.

When preparing tablets, pills, dragees, and the like shaped preparations which are used in human and veterinary therapy, the commonly used diluting agents, binders, expanding agents, lubricants, and the like are employed, such as sugar, lactose, talc, starch, bolus alba, pectin; as binders, gelatin, gum arabic, methyl cellulose, yeast extract, agar, tragacanth; and as lubricants, stearic acid, magnesium stearate, and others.

The contents of the new salt of the isonicotinic acid hydrazone of benzaldehyde-m-sulfonic acid with dihydrostreptomycin and other basic antibiotics in such preparations according to the present invention may vary. It is, of course, advisable that the active compound is present in such preparations in an amount sufficiently high to ensure a suitable dosage. Ordinarily the preparations should contain not less than 0.1% of the active salts. The preferred amounts to be employed are between about 50% and about 95% of the preparation. Tablets containing, for instance, between about 100 mg. and about 1000 mg. and preferably about 500 mg. of the active salt per tablet have proved to be especially suitable.

The following examples of therapeutically useful preparations containing, as active ingredients, the new salts, are intended to be illustrative only, without being limited thereto.

EXAMPLE 5

Tablets of the following composition are prepared:

| | Grams |
|---|---|
| The salt of the isonicotinic acid hydrazone of benzaldehyde-m-sulfonic acid with dihydrostreptomycin prepared according to Example 2 | 50,000 |
| Cornstarch | 5,500 |
| Lactose | 1,200 |
| Stearic acid | 300 |
| Talc | 3,000 |

Lactose and cornstarch are mixed with the new salt and are granulated by the addition of sufficient water to produce small granules. These granules are mixed with talc and stearic acid and the mixture is tableted. 100,000 tablets are formed, each containing 500 mg. of the isonicotinic acid hydrazone of benzaldehyde-m-sulfonic acid with dihydrostreptomycin.

EXAMPLE 6

Sugar-coated dragees of the following composition are prepared:

| | G. |
|---|---|
| Isonicotinic acid hydrazone of benzaldehyde-m-sulfonic acid with framycetin obtained according to Example 3 | 50,000 |
| Cornstarch | 5,500 |
| Lactose | 1,200 |
| Talc | 3,000 |
| Magnesium stearate | 300 |
| Sugar for coating | 20,000 |

The new salt, corn starch, and lactose are intimately mixed with each other and are granulated by the addition of the required amount of water. Thereafter, talc and magnesium stearate are added and the mixture is tableted to form cores for dragees which are then sugar-coated in the conventional manner. About 100,000 dragees are obtained from the above indicated mixture, each dragee containing about 500 mg. of the active salt.

EXAMPLE 7

2,000 g. of the salt of isonicotinic acid hydrazone of benzaldehyde-m-sulfonic acid with dihydrostreptomycin, obtained as described hereinabove in Example 2, are dissolved in 10 liters of distilled water. The solution is filtered and filled into glass ampoules, each containing 2.2 cc. of the liquid, with a content of 200 mg. of active ingredient per cc. The ampoules are sealed and sterilized for 30 minutes at 105° C.

In human therapy, the dosage administered to patients suffering from tuberculosis are about as follows:

*Oral administration.*—Between 2,000 mg. and 3,000 mg. per day subdivided in equal doses.

In patients which are seriously ill, such as those suffering from tuberculous meningitis or miliary tuberculosis the daily oral dose should initially be increased to about 4,000 mg. for a period of 7 to 10 days whereafter the dosage is reduced to the above given maximum total daily dose.

*Administration by intramuscular injection.*—Between 500 mg. and 2,000 mg. per day twice daily in the morning and in the evening given in the form of an aqueous or isotonic salt solution.

Of course, many changes and variations in the reaction components, the solvents used, the reaction conditions, temperature duration, concentration of the reaction components, in the methods of working up the reaction mixture and of isolating and purifying the reaction products, and the like, may be made by those skilled in the art in accordance with the principles set forth herein and in the claims annexed hereto.

We claim:

1. The salt of the isonicotinic acid hydrazone of benzaldehyde-m-sulfonic acid with an antibiotic having a basic group, said antibiotic being selected from the group consisting of streptomycin, dihydrostreptomycin, erythromycin, framycetin, and neomycin, said salt having a substantially lower toxicity and a substantially higher growth inhibiting effect on tubercle bacilli than the antibiotics themselves and their reaction products with isonicotinic acid hydrazide.

2. The salt of the isonicotinic acid hydrazone of benzaldehyde-m-sulfonic acid with dihydrostreptomycin, said salt having a substantially lower toxicity and a substantially higher growth inhibiting effect on tubercle bacilli than dihydrostreptomycin and its reaction product with isonicotinic acid hydrazide.

3. The salt of the isonicotinic acid hydrazone of benzaldehyde-m-sulfonic acid with streptomycin, said salt having a substantially lower toxicity and a substantially higher growth inhibiting effect on tubercle bacilli than dihydrostreptomycin and its reaction product with isonicotinic acid hydrazide.

4. The salt of the isonicotinic acid hydrazone of benzaldehyde-m-sulfonic acid with framycetin, said salt having a substantially lower toxicity and a substantially higher growth inhibiting effect on tubercle bacilli than framycetin.

5. The salt of the isonicotinic acid hydrazone of benzaldehyde-m-sulfonic acid with erythromycin, said salt having a substantially lower toxicity and a substantially higher growth inhibiting effect on tubercle bacilli than erythromycin.

6. A method of combating tubercle bacilli, said method comprising administering a composition comprising not less than 0.1% of the salt of the isonicotinic acid hydrazone of benzaldehyde-m-sulfonic acid with dihydrostreptomycin to a human or animal host infected with tubercle bacilli.

7. A method of combating tuberculosis, said method comprising administering a composition comprising not less than 0.1% of the salt of the isonicotinic acid hydrazone of benzaldehyde-m-sulfonic acid with an antibiotic having a basic group, said antibiotic being selected from the group consisting of streptomycin, dihydrostreptomycin, erythromycin, framycetin, and neomycin to a human or animal host infected with tubercle bacilli.

8. A composition for combating tuberculosis, said composition comprising not less than 0.1% of the salt of the isonicotinic acid hydrazone of benzaldehyde-m-sulfonic acid with dihydrostreptomycin and a sterile parenteral water diluent.

9. A composition for combating tuberculosis, said composition comprising not less than 0.1% of the salt of the isonicotinic acid hydrazone of benzaldehyde-m-sulfonic acid with dihydrostreptomycin and a solid pharmaceutical carrier.

10. A veterinary feed for combating tuberculosis, said feed comprising not less than 0.1% of the salt of the isonicotinic acid hydrazone of benzaldehyde-m-sulfonic acid with dihydrostreptomycin.

11. A composition for combating tuberculosis, said composition comprising not less than 0.1% of the salt of the isonicotinic acid hydrazone of benzaldehyde-m-sulfonic acid with an antibiotic having a basic group, said antibiotic being selected from the group consisting of streptomycin, dihydrostreptomycin, erythromycin, framycetin, and neomycin, and a pharmaceutical carrier.

References Cited in the file of this patent

UNITED STATES PATENTS

| | | |
|---|---|---|
| 2,509,191 | Lott et al. | May 23, 1950 |
| 2,604,472 | Regna et al. | June 22, 1952 |
| 2,650,216 | Carboni et al. | Aug. 25, 1953 |
| 2,727,041 | Girard | Dec. 13, 1955 |
| 2,750,388 | Yale | June 12, 1956 |
| 2,753,353 | Bernstein et al. | July 3, 1956 |
| 2,753,354 | Hammer | July 3, 1956 |
| 2,857,376 | Ziegler | Oct. 21, 1958 |

OTHER REFERENCES

Chemical Abstracts, vol. 47, p. 4505i (1953).

Robitzek et al.: Quarterly Bulletin of the Sea View Hosp., vol. XIII, No. 1, January 1952, pp. 35–56.

Bernstein et al.: American Review of Tuberculosis, vol. 67, No. 3, March 1953, pp. 354–365.

Bavin et al.: J. Pharmacy and Pharmacology, vol. 4, No. 11, November 1952, pp. 844–855.

Fox et al.: J. Org. Chem., vol. 18, No. 8, August 1953, pp. 983–1002.